United States Patent [19]

Kruse

[11] Patent Number: 5,208,447
[45] Date of Patent: May 4, 1993

[54] METHOD FOR TESTING A TERMINAL COMMUNICATING WITH CHIP CARDS

[75] Inventor: Dietrich Kruse, Ottobrunn, Fed. Rep. of Germany

[73] Assignee: Siemens Aktiengesellschaft, Munich, Fed. Rep. of Germany

[21] Appl. No.: 527,439

[22] Filed: May 23, 1990

[30] Foreign Application Priority Data

May 30, 1989 [DE] Fed. Rep. of Germany ....... 3917540

[51] Int. Cl.$^5$ .............................................. G06K 5/00
[52] U.S. Cl. .................................................. 235/380
[58] Field of Search ...................................... 235/380

[56] References Cited

U.S. PATENT DOCUMENTS

| | | | |
|---|---|---|---|
| 4,283,599 | 8/1981 | Atalla | 235/380 |
| 4,549,075 | 10/1985 | Saada et al. | 235/380 |
| 4,630,201 | 12/1986 | White | 235/380 |
| 4,650,975 | 3/1987 | Kitchener | 235/380 |
| 4,656,474 | 4/1987 | Mollier et al. | 235/380 |
| 4,771,460 | 9/1988 | Tamada et al. | 235/380 |
| 4,786,790 | 11/1988 | Kruse et al. | 235/380 |
| 4,910,774 | 3/1990 | Barakat | 235/380 |
| 4,935,962 | 6/1990 | Austin | 235/380 |
| 4,961,142 | 10/1990 | Elliott et al. | 235/380 |

FOREIGN PATENT DOCUMENTS

| | | |
|---|---|---|
| 0029894 | 6/1981 | European Pat. Off. . |
| 0138386 | 4/1985 | European Pat. Off. . |
| 2600188 | 12/1987 | France . |
| 2144564 | 3/1985 | United Kingdom . |

*Primary Examiner*—Eugene R. LaRoche
*Assistant Examiner*—Michael C. Kessell
*Attorney, Agent, or Firm*—Hill, Steadman & Simpson

[57] ABSTRACT

Method for testing a terminal communicating with chip cards. The method has the steps of: identification data stored in the chip card is used to generate authentification codes both in the chip card and in the terminal after transmission thereto of the identification data stored in the chip card, both authentification codes being generated with respective action codes using a stored algorithm; the authentification code generated in the chip card is transmitted to the terminal; the two authentification codes are compared in the terminal; and the identification data is displayed at the terminal when the two authentification codes, compared in the terminal, are identical.

3 Claims, 1 Drawing Sheet

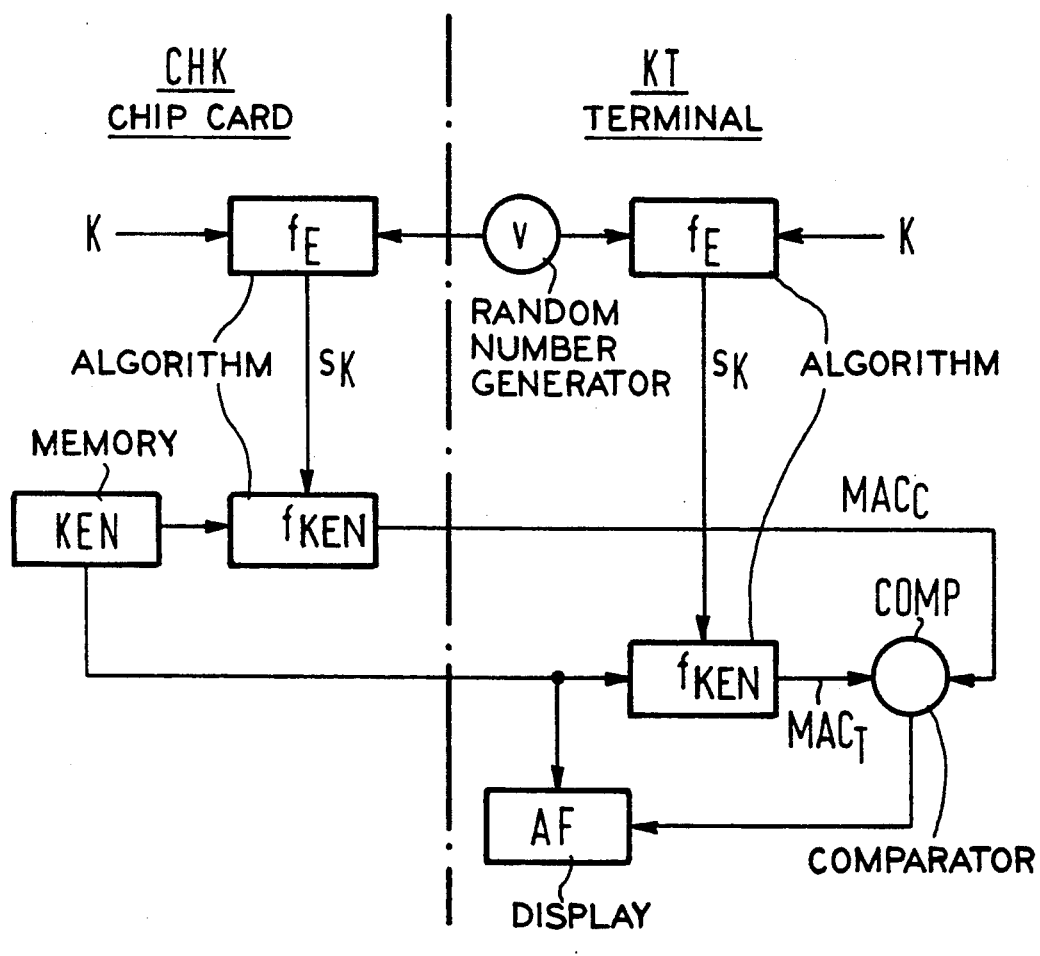

METHOD FOR TESTING A TERMINAL COMMUNICATING WITH CHIP CARDS

BACKGROUND OF THE INVENTION

The present invention is directed to a method for testing a terminal communicating with chip cards using an action code respectively derived both in the chip card and in the terminal from a common secret code and from a common algorithm dependent on a common random number.

The protection of data plays an increasingly important role in modern data processing and communications systems. The quality of a system with respect to adequate data protection is critically dependent upon the degree to which one succeeds in making access to the system possible only for authorized persons and, conversely, keeping non-authorized persons locked out with absolute reliability. A simple although not absolutely certain possibility for checking the access authorization to a system is to use passwords that are known only to the authorized user and which the user can change as often as he desires. Since there is a risk that such passwords can be obtained by unauthorized persons, additional protection measures are indispensable. For example, one of these measures is the coding and decoding of the transmitted information, a measure that can be realized in data processing systems utilizing, among other things, a chip card. With the increasing use of the chip card in data processing systems, however, an additional security risk arises because chip cards can be relatively easily lost. Care must therefore be absolutely exercised to insure that the chip card is protected against potential misuse in all instances when lost. The chip card is therefore designed such that the data stored in a protected chip card can only be accessed when the user inputs in advance an identifier, for example a personal identification number, referred to as a PIN, that is stored only in the chip card.

A further security barrier can be erected with the assistance of authentification of the chip card vis-a-vis the system. This authentication prevents an arbitrary subscriber from accessing secret information in the system by pretending to be authorized. A critical prerequisite for the authentification is a personal feature of the subscriber that cannot be copied. This feature of the subscriber is achieved by use of a secret cipher for the coding and decoding that is only known to the two parties, that is, the chip card and the system.

The close, circuit-oriented linkage between the chip card and a user terminal, however, assumes that not only the user of the chip card documents his identity but also that the data flow sequences without manipulation in the terminal. Included thereamong, for example, is that the identification number PIN input by the chip card user cannot be read out and that data displayed by the terminal also coincides with the data transferred to the chip card. A manipulation of the nature that supposedly true data is displayed to the user and that false data is processed in the chip card must be made impossible with a high degree of reliability.

SUMMARY OF THE INVENTION

An object of the present invention is to provide a method that allows the user of a chip card to quickly and simply recognize whether the terminal into which he has inserted his chip card and with whose keyboard he has input his personal identification number PIN is properly working, that is, is operating such that the terminal is protected against counterfeiting in an unmanipulated fashion. One skilled in the art can implement this test with presently known chip cards and a testing procedure triggered in advance by the chip card, utilizing a random number generated in the chip card, identical security procedures sequenced in the chip card and in the terminal, and a check of the results in the chip card. Such a system is disclosed in U.S. Pat. No. 4,786,790, hereby incorporated by reference.

This object is in accordance with the principles achieved by a method of the present invention for testing a terminal communicating with chip cards using a respective action code derived both in the chip card as well as in the terminal from a common secret code and from a common algorithm dependent on a common random number. The novel method has the steps of:

from identification data stored in the chip card generating an authentification code both in the chip card as well as in the terminal after transmission thereinto of the identification data in the chip card, the authentification codes being generated by respective action codes using a stored algorithm;

transmitting the authentification code generated in the chip card to the terminal;

comparing the two authentification codes in the terminal; and displaying the identification data at the terminal when the two authorization codes, compared in the terminal, are identical.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, and in which:

The single figure depicts in block diagram from a system for implementing the method of the present invention.

DESCRIPTION OF THE PREFERRED EMBODIMENT

The single figure shows a chip card CHK in its left-hand part and an associated card terminal KT in its right-hand part, whereby only those respective components needed for an understanding of the method of the present invention are depicted. The starting point of the method is initially a test cycle wherein a determination is made using the chip card as to whether the terminal is operating faultlessly in the sense of data protection and as to whether the indication of proper operation is being simulated by, for instance, potential manipulations. This test, for example, is executed such that, first, arbitrary but identical program parts in both components are selected from sensitive program data for data flow control using a random number generated in the chip card, being selected both in the chip card and in the terminal after the transmission thereof, and, subsequently, a respective authentification code is respectively formed using an algorithm and a secret code. Both codes are finally checked for identity in a comparison means present in the chip card (an indication for the "legitimacy" of the terminal).

So that the card user can now also convince himself of the "legitimacy" of the terminal, an action code $S_K$ is generated both in the chip card CHK and in the terminal KT using a random number v. To this end, the random number v is encoded using a secret code K and an algorithm $f_E$ deposited in both components, being respectively encoded both in the terminal KT as well as in the chip card CHK after the transmission thereof. The result of this coding is what is referred to as the action code $S_K$. Further, an identifier KEN previously stored in the chip card CHK at some previous time is authentically transmitted to the terminal KT. This identifier KEN is transmitted directly a first time and is also cryptographically encoded and transmitted a second time, whereby this encoding occurs using the action code $S_K$ and the algorithm $f_{KEN}$ which is stored in the chip card CHK. The identifier KE directly transmitted into the terminal KT is also encoded in an analogous fashion. The authentification code $MAC_T$ which is generated in the terminal KT and the transmitted authentification code $MAC_C$ are ultimately supplied to a comparator COMP that, given equality of the two signals, supplies a control signal for the display field AF of the terminal KT and initiates the display of the identifier KEN that was transmitted into the terminal.

When the user does not see the identifier KEN that is known only to him, either the terminal KT is being manipulated or the identifier in the chip card CHK is wrong. In any case, the user must then select a new identifier at a different terminal, preferably in a confidential environment. Like the personal identification number PIN, this identifier can be freely selected. The input prerequisite for a new identifier is the previous, correct input of the personal identifier identification number PIN. Other unmanipulatable events from the chip card can also be displayed at the terminal in the above-described manner.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. Method for testing a terminal communicating with chip cards using a respective action code derived both in the chip card as well as in the terminal from a common secret code and from a common first algorithm dependent on a common random number, in addition to performing a check of a personal identification number, comprising of the steps of:

transmitting identification data, that is stored in the chip card, in an uncoded form from the chip card to the terminal;

generating an authentication code in the chip card from the identification data using a common second algorithm and using the action code, and generating an authentication code in the terminal from the identification data using the common second algorithm and using the action code;

transmitting the chip authentification code generated on the chip card to the terminal, thereby transmitting the identification data in a coded form from the chip card to the terminal;

comparing the two authentification codes in the terminal; and displaying the identification data at the terminal when the two authentification codes, compared in the terminal, are identical.

2. Method for testing a terminal communicating with at least one chip card using a respective action code derived both in the chip card as well as in the terminal from a common secret code and from a common algorithm dependent on a common random number, in addition to performing a check of a personal identification number, the method comprising the steps of:

storing identification data in the chip card;

transmitting the identification data in an uncoded form from the chip card to the terminal;

generating in the chip card a chip authentification code from the identification data using the respective action code and an algorithm stored in the chip card;

generating in the terminal a terminal authentification code from the identification data transmitted by the chip card using the respective action code and an algorithm stored in the terminal;

transmitting the chip authentification code generated in the chip card to the terminal, thereby transmitting the identification data in a coded form from the chip card to the terminal;

comparing the chip and terminal authentification codes in the terminal; and displaying the identification data at the terminal when the chip authentification code is identical to the terminal authentification code.

3. Method for testing a terminal communicating with chip cards using a respective action code derived both in the chip car as well as in the terminal from a common secret code and from a common first algorithm dependent on a common random number, in addition to a check of a personal identification number, comprising the steps of:

transmitting identification data, that is stored in the chip card, from the chip card to the terminal;

generating an authentication code in the chip card from the identification data using a common second algorithm and using the action code, and generating an authentication code in the terminal from the identification data using the common second algorithm and using the action code;

comparing the two authentification codes in the terminal; and displaying the identification data at the terminal when the two authentification codes, compared in the terminal, are identical, the common first algorithm being identical to the common second algorithm.

* * * * *